United States Patent [19]

Newell

[11] Patent Number: 5,142,181

[45] Date of Patent: Aug. 25, 1992

[54] DIRECT CURRENT DYNAMO

[76] Inventor: Stanley E. Newell, 7048 17th N.E., Seattle, Wash. 98115

[21] Appl. No.: 550,048

[22] Filed: Jul. 9, 1990

[51] Int. Cl.$^5$ ............................................. H02K 1/22
[52] U.S. Cl. ................................... 310/268; 310/184; 310/198; 310/141
[58] Field of Search ............... 310/268, 182, 184, 183, 310/128, 198, 141; 242/7.11

[56] References Cited

U.S. PATENT DOCUMENTS

| | | | |
|---|---|---|---|
| 3,214,717 | 10/1965 | Brodersen | 336/135 |
| 3,432,707 | 3/1969 | Peters et al. | 310/195 |
| 4,132,914 | 1/1979 | Khutoretsky et al. | 310/184 |
| 4,716,329 | 12/1987 | Oh | 310/183 |
| 4,808,955 | 2/1989 | Godkin et al. | 335/222 |
| 4,910,626 | 3/1990 | Collet et al. | 361/19 |

Primary Examiner—Steven L. Stephan
Assistant Examiner—E. To
Attorney, Agent, or Firm—Robert W. Jenny

[57] ABSTRACT

The subject dynamoelectric machine comprises an armature between two field assemblies. The armature may rotate between the field assemblies or vice versa. The armature has three two-coil windings with the coils of each winding located diametrically opposite each other on the armature and wound in opposite directions. Each field assembly comprises a field ring, winding cores (or permanent magnets) and pole faces which span essentially 180°, there being a north face and a south face for each field assembly. The field assemblies are positioned with like faces facing each other. The commutation apparatus energizes each armature winding just as it is positioned completely between the field pole faces and de-energizes it just before it starts to move out from between the faces because of the relative motion between the armature and field assemblies. The machine concept is adaptable to pancake and cylindrical configuration. The opposite direction winding of the armature coils virtually eliminates armature inductance and reaction effects. The machine also adapts to brushless commutation techniques.

2 Claims, 3 Drawing Sheets

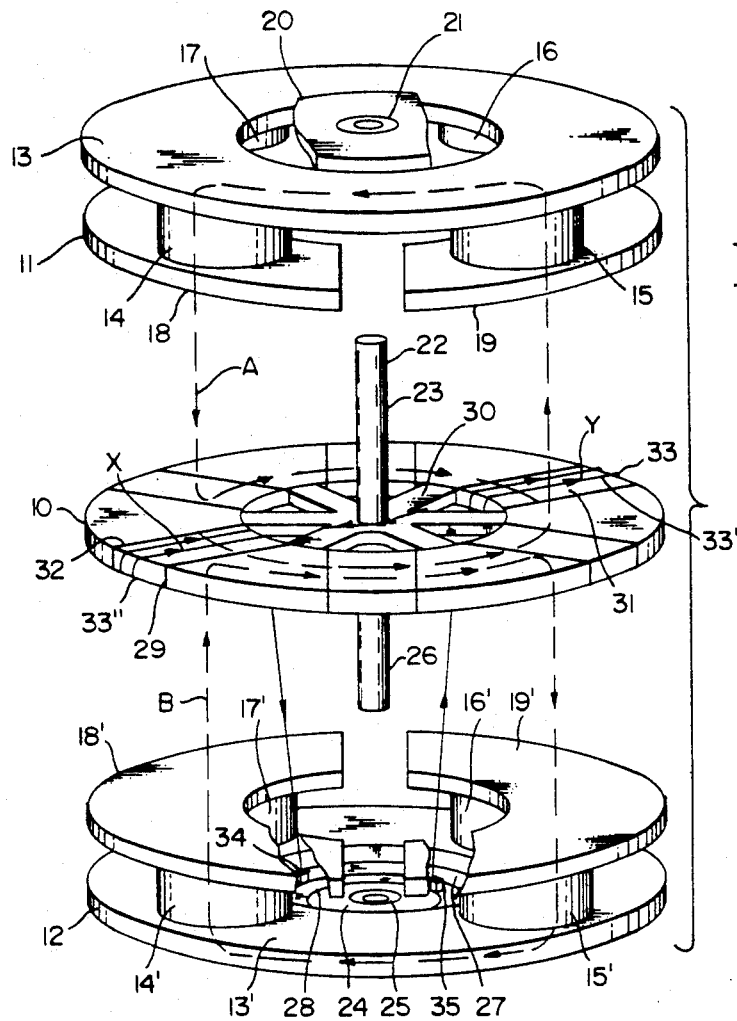
FIG. 1
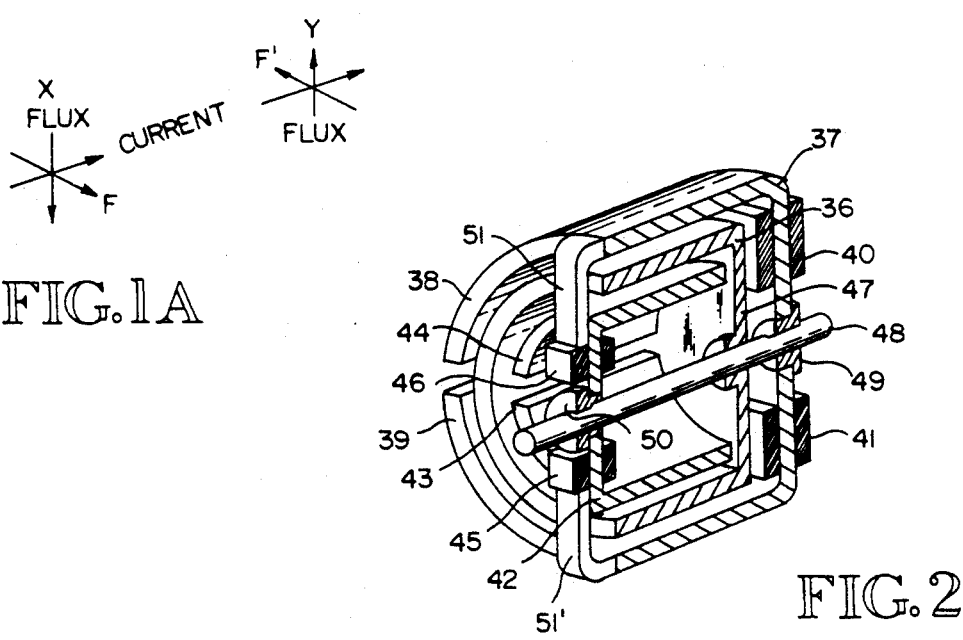
FIG. 1A
FIG. 2

DIRECT CURRENT DYNAMO

BACKGROUND OF THE INVENTION

1. Field

The subject invention is in the field of dynamo-electric machinery; i.e. machinery which converts mechanical energy into electrical energy or electrical energy into mechanical energy. More specifically it is in the field of such machinery using direct electrical current.

2. Prior Art

There is much prior art in this field. However, the basic configuration of direct current motors and generators has not changed significantly in many years and, although such equipment has been and is clearly useful and commercially successful, there has been a long-standing recognition that certain characteristics of such machinery have detracted from its functional efficiency and prevented the manufacturing costs from being even lower. One such characteristic is that the commutators in conventional motors have several poles in smaller motors and generators and many more in larger equipment. A second is that the armature windings inherently have more inductance than desired because of resulting problems with sparking at the contacts between the brushes and commutator. The inductance in the armature windings produces armature reaction which is manifested by distortion of the magnetic flux of the field, lowering efficiency, and by the aforementioned commutation problems Alleviation of these difficulties requires the use of interpoles (commutating poles) and, in many cases, compensating windings. Both the interpoles and compensating windings tend to lower overall efficiency and clearly increase manufacturing costs.

Therefore a primary objective of the subject invention is to provide direct current dynamoelectric machines in which armature inductance and the related armature reaction are virtually non-existent with the result that such machines can be more efficient than conventional direct current motors and generators. A second objective is that motors and generators made according to the subject invention be simple and economical to manufacture and thereby both more efficient and more economical to manufacture than conventional direct current motors and generators.

SUMMARY OF THE INVENTION

In a fundamental embodiment of the subject invention the windings conductor of the armature move between facing poles of like polarity, i.e. a pair of facing south poles and a pair of facing north poles, comprising the field. Each armature winding comprises two coils, the coils being located diametrically opposite from each other and with the windings of one coil being in the opposite direction to those on the other. The windings are around a ring-shaped armature core with essentially half the conductors in each coil on each side of the armature core. The flux path is from the facing north poles, past the conductor closest to each pole, into the armature core, through the core, past the conductors closest to each of the facing south poles and returning to the north poles via field rings, one for each pair of field poles. There are two such paths, symmetrical and opposite.

Considering a single turn of a single coil arranged such that the windings are essentially radial from the axis of the armature of a pancake style motor, the current in the conductor flows radially outward on one side of the armature core and radially inward on the other and thus in opposite directions. However, because of the dual symmetrical flux paths, the flux flow directions past the parts of the turn on opposite sides of the armature core are also in opposite directions. Therefore, in a motor the torque producing forces on the conductor segments on each side of the armature core are in the same direction and, in a generator, the torque resisting forces are in the same direction and the current production in both working parts of each coil are additive. It will be made clear in the following detailed description of the invention that with this field/armature combination the field may have only two sets of poles and the armature only three two-coil windings, the result being that only three commutations per turn are required. Also, because the windings in the two coils of each armature winding are in opposite directions, the armature windings have little or no net inductance. As a result of these two characteristics, motors and generators made according to the subject invention (1) are virtually free of armature reactance and the attendant losses and (2) require only three commutation switchings per revolution, regardless of the size of the machine.

A pancake type embodiment of a motor according to the subject invention, with the field shaft vertical for purposes of description, comprises an upper field ring, field coils wound around cores below the ring, a north face and a south face adjoining the coils and cores, each face spanning almost 180°, an air gap between these faces and the armature, the coil parts on the top side of the armature ring (core), the ring itself, the coil parts on the bottom side of the armature ring, an air gap between these coil parts and the faces of the lower field assembly, the faces of the lower field assembly, the windings and cores of the lower field assembly and the lower field ring. The field shaft is supported in bearings held at the centers of the field rings by non-magnetic structures. Commutation for the armature is provided by suitable means well known in the art, comprising suitable armature/stator relative position detection means to time the switching on an off of electrical power to or from the armature windings. The motor or generator may be wired in any of the various ways the conventional dynamoelectric machines are wired.

The invention is described in more detail below with reference to the attached drawings.

BRIEF DESCRIPTION OF THE DRAWINGS

FIG. 1 is a schematic diagram indicating the basic features of the wiring and the flux flow patterns of the subject invention in a pancake configuration.

FIG. 1A is a flux/current/force diagram for the armature windings.

FIG. 2 is a diagram similar to that of FIG. 1 but showing the basic features applied to a cylindrical configuration.

DETAILED DESCRIPTION OF THE INVENTION

Figure 3:
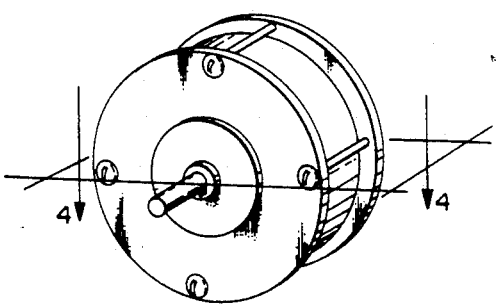
FIG. 3 is a perspective view of an embodiment of the subject invention.

The subject invention is a dynamoelectric machine in which armature reactance is virtually non-existent and which requires no more than 3 commutation switchings per revolution regardless of the size of the machine.

The basic features of the concept, applied to a "pancake" configuration are shown in FIG. 1.

In FIG. 1 the machine comprises armature 10 and field assemblies 11 and 12. Field assembly 11 comprises a field ring 13, winding cores 14, 15, 16 and 17 and field pole faces 18 and 19. Field assembly 12 comprises the same components numbered with the same numbers primed. Structure 20 attached to field ring 13 supports bearing 21 for one end 22 of armature shaft 23, and structure 24 attached to field ring 13' supports bearing 25 for end 26 of the armature shaft. Structure 24 also supports slip ring 27 and commutator ring 28.

Armature 10 comprises armature ring 29 supported on structure 30 which is attached to shaft 23 with the plane of ring 29 perpendicular to the axis of the shaft.

Armature 10 is shown marked off into six segments, segments 31 and 32 being typical. There are three windings on the armature, winding 33 being shown and typical. Each winding comprises two coils, coils 33' and 33" for winding 33. The coils are wound in opposite directions, as indicated by the arrowheads of the conductor lines. The current direction (also indicated by the arrowheads) is radially outward on the upper part of the winding coil 33' and radially inward on the upper part of the winding of coil 33". Electrical current is supplied to the winding from brush 34 contacting commutator ring 28, flows through the winding and exits at brush 35 contacting slip ring 27.

The field assemblies are wound and wired such that field pole faces 18 and 18' are of the same polarity and field pole faces 19 and 19' are also of the same polarity. For purposes of this description poles 18 and 18' are north poles and 19 and 19' south poles. The resulting magnetic flux paths are indicated schematically by the dashed lines with arrowheads indicating flux flow direction. There are two paths, A and B, A for the upper field assembly and B for the lower. For purposes of this description, the flow of path A starts at pale face 18, goes through the parts of the armature windings facing pole face 18, through the armature core, upward through the parts of the windings facing pole face 19, through pole face 19 and cores 14 and 15 and then through field ring 13 and cores 16 and 17 to pole face 18. Path B is exactly the same but passes through field assembly 12.

It is noted here that the motor could operate with only one field assembly.

The current flow in each two segment coil is turned on by the commutation just as the coil segments move completely between two opposing field polefaces and turned off just before the segments begin to emerge from between those pole faces. The current is switched on again in the opposite direction when the two coils have moved completely under the other set of opposing pole faces. Because the coils are wound in opposite directions, there is little or no inductance involved in the communtative switching.

FIG. 1A diagrammatically indicates the related directions of flux and current flows in the conductors at point X and Y in FIG. 1 and the resultant force direction on the conductors. At point X the flux flows downward, the current flows radially inward and the force direction F is such that the armature will turn counterclockwise in FIG. 1. At point Y the flux flow is upward, the current flow is radially outward and the force direction F' is again in the direction such that the armature rotation will be counterclockwise in FIG. 1. This pattern holds true for all the conductors moving across the flux flows.

FIG. 2 is a schematic representation of the invention in a cylindrical rather than pancake embodiment. Armature 36 is cylindrical. No windings are shown but there would be 3 two-coil windings as shown for the pancake configuration. Field assembly 37 surrounds the armature, has two poles 38 and 39 and windings 40 and 41. Field assembly 42 is surrounded by the armature, has poles 43 and 44 and coils 45 and 46. The armature is supported on circular plate 47 which is carried on shaft 48 support in bearings 49 and 50. Field assembly 42 is supported from field assembly 37 by non-magnetic structures 51 and 51'. The complete unit is supported from the outer field assembly.

FIG. 3 is a perspective view of a pancake embodiment of the invention, described in more detail with reference to FIG. 4, a sectional view of the motor taken at 4—4 in FIG. 3. The motor (or generator) in FIG. 4 comprises field rings 52 and 53, field windings 54 and 55, field pole faces 56 and 57, armature winding(s) 58 (described below) and armature core 59. The armature core and windings are supported on shaft 60 by non-magnetic hub 61 which also comprises brush holder portion 62. The shaft is supported by bearings 63 and 64 attached to parts 65 and 66 which are pressed into field rings 52 and 53. The field rings are spaced apart by non-magnetic cylinder 67 and held in place by fasteners of which bolt 68 and nut 69 are typical.

Figure 4:
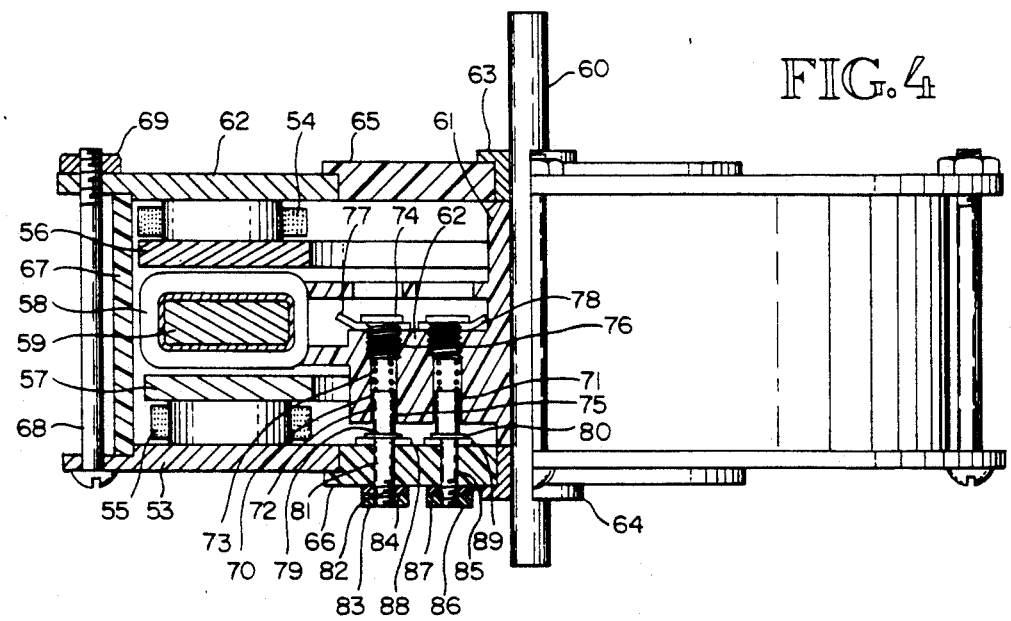
FIG. 4 is a sectional view of the FIG. 2 embodiment taken at 4—4 in FIG. 2.
Figure 4A:
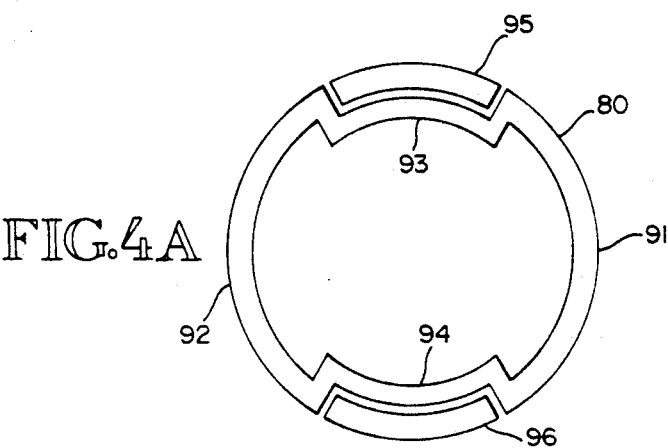

Since (1) the coils of this armature are energized only when they are completely between field pole faces and (2) the coil segments are 60° "wide", each coil is energized for two 120° parts of each revolution and the commutator ring, described below, is configured as shown in FIG. 4a provide such energization. The 120° segments are positioned to correspond to the "middle" 120° of the essentially 180° field pole faces. The brush assemblies in the subject embodiment are mounted on the armature in the brush holder portion, two assemblies per coil, the brush in one assembly contacting a slip ring, described below, the other the commutator ring. The brush assemblies 70 and 71 in FIG. 4 are for one armature coil. Each assembly comprises a brush 72, a spring 73 and a threaded terminal cap 74. The brush and spring fit into a bore 75 in the brush holder portion and the cap is threaded into a threaded portion 76 of the hole to retain the brush and spring. Electrical energy conductors 77 and 78 lead to the winding served by these brushes.

Brush assembly 70 functions with slip ring 79 and brush assembly 71 functions with commutator ring 80. Ring 79 is held in place against part 66 by pin 81 which is threaded at end 82 and engaged by nut 83. Terminal 84 is held between the nut and part 66 and extends from the slip ring. Similarly commutator ring 80 is held in place by threaded pin 85 and nut 86 and terminal 87 extends from the commutator ring.

Electrical power is applied to (or taken from) the machine via terminals 84 and 87. The field coils are connected to terminals 88 and 89. As shown, the field and armature windings are thus connected in parallel. It is considered to be within the capabilities of persons of ordinary skill in the art to arrange to connect them in series if desired.

FIG. 4A illustrates a commutator ring 80 in planview, i.e. looking down at the top of part 66. Sections 91 and 92 are contacted by the commutation brushes of the coils. Sections 93 and 94 interconnect segments 95 and 96 carry the brushes from section 91 to section 92.

Figure 5:
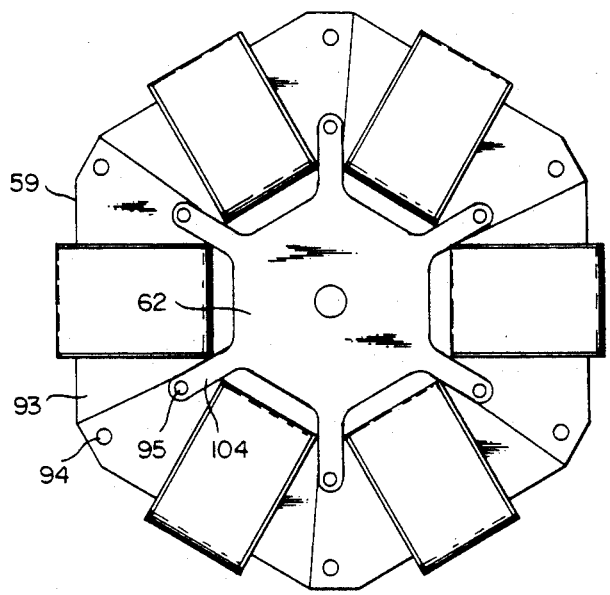
FIG. 5 is a plan view of one embodiment of the armature of the FIG. 2 embodiment of subject invention.

FIG. 5 is a planview taken at 4—4 of one embodiment of the armature which enables winding the armature coils independently and without the need for using the apparatus used in winding toroidal coils. The armature core 59 comprises 6 trapezoidal-shaped coils, section 93 being typical. The coils are fastened together to form a hexagonal ring. However, it is feasible also to make each section part of a circular ring so that the armature is a circular ring. The armature is attached to hub 62 by some of the fasteners which hold the armature segments together, fasteners 94 and 95 being typical with fastener 95 serving the double purpose of holding armature coils together and attaching the armature ring to the hub.

Figure 6:
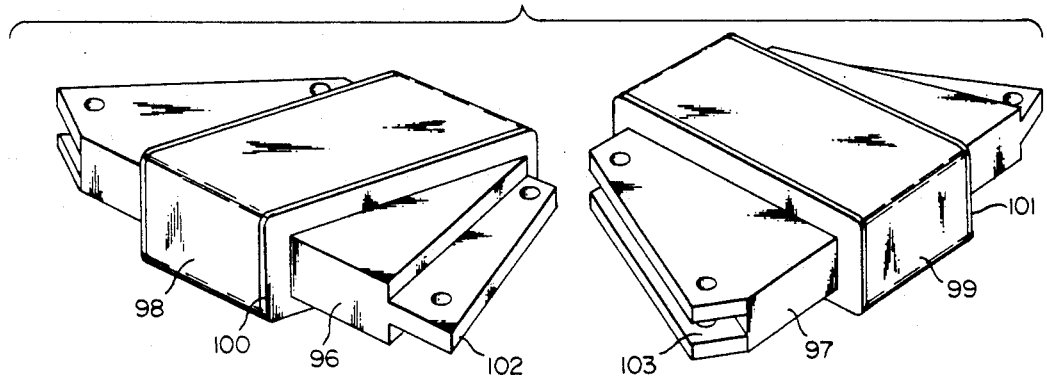
FIG. 6 is an exploded view of part of the armature of FIG. 4, showing construction details.

FIG. 6 illustrates in perspective armature coils 96 and 97 with coils 98 and 99 in place on the coils. The coils are wound on a specially shaped spool 100 and 101 made of thin magnetic material which fits snugly over the core segment. The coil is rectangular in planview and the core segments have a tongue 102 at one end and a groove 103 at the other. The radial arms, arm 104 being typical, of the hub extend between coils to be engaged by fastener(s) 95.

Figure 7:
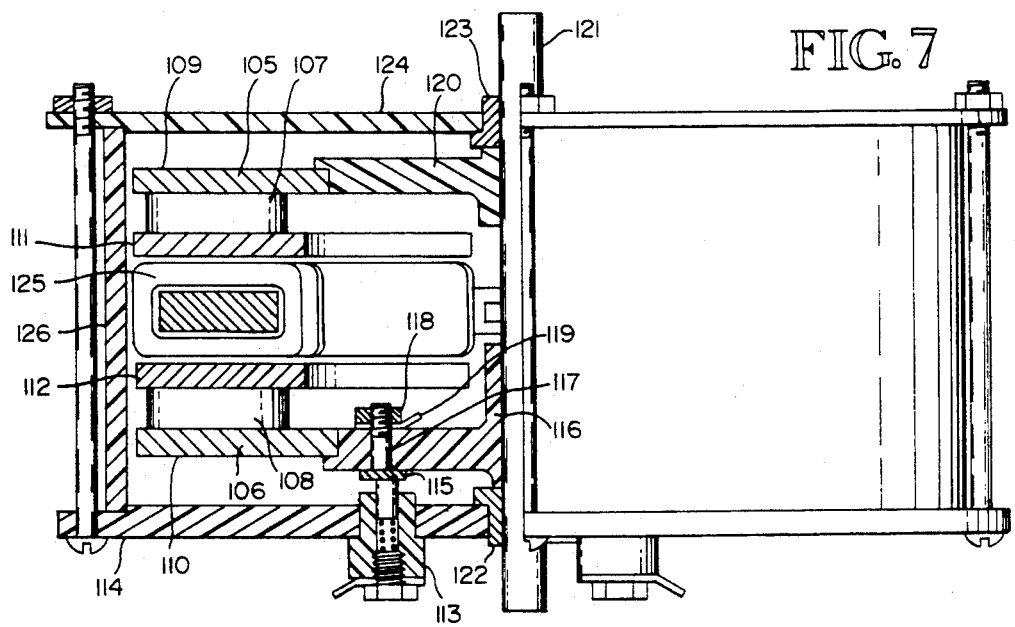
FIG. 7 is a sectional view of an embodiment of the subject machine in which the armature is stationery and the field assemblies rotate.

FIG. 7 is a schematic sectional view, similar to FIG. 4, of an embodiment of the machine in which the armature is stationary and the field assemblies rotate with the shaft. Field assemblies 105 and 106 are made with permanent magnets 107 and 108 between the field rings 109 and 110 and the field pole faces 111 and 112. In this embodiment no slip ring is needed. One end of the conductor on each two-coil winding in the armature is permanently connected. The other end of each conductor is connected to a commutator ring segment. The commutator is a ring split into 3 segments, each 120° arc lengths, equally spaced. Three brush assemblies, one for each winding, assembly 113 being typical, are installed in the non-magnetic end plate 114 of the machine and commutator ring 115 is attached to the lower surface of hub 116. Each segment contacts a brush for a winding each time pole faces completely cover that winding, and breaks contact with the brush just before the pole faces starts to uncover that winding. Commutator ring 115 is held to hub 116 by threaded pin 117 and nut 118. Connector 119 is connected to a coil. Hub 120 supports field ring 109 and both hubs are attached to shaft 121 supported in bearings 122 and 123, 122 being pressed into end plate 114 and 123 being pressed into end plate 124. Armature 125 is fastened to non-magnetic casin 126.

In this embodiment the commutator sequentially energizes each armature winding as the field pole faces move so that the winding is fully between pole faces and de-energizes each winding as the pole faces begin to move out of full coverage of the coil. The nature and function of structure shown in this FIG. and not recited herein are considered to be obvious to those skilled in the art.

Brushless commutation techniques can be used to full advantage with the subject invention. For example, magnetically actuated reed switches can be installed at the brush locations and actuated by appropriately shaped and positioned magnetic strips installed in place of the commutator ring.

It is also considered to be clear from this description that the invention meets its objectives. The winding of the coils of the armature winding in opposite directions makes armature inductance and related armature reactance virtually non-existent and the machines are simple and straightforward in design and construction, making them correspondingly simple and economical to design and manufacture.

It is also considered to be clear that while certain embodiments of the invention are described herein, other embodiments and modifications of those described are possible within the scope of the invention which is limited only by the attached claims.

I claim;

1. A dynamoelectric machine comprising:
   at least one field assembly,
   an armature,
   two electrical energy conductors,
   means for enabling relative rotation of said at least one field assembly and said armature,
   said at least one field assembly comprising a field ring, two pole faces and means for magnetizing said field assembly,
   said armature comprising a core and a plurality of windings, each of said plurality of windings being two-coil windings with said two coils of each winding located diametrically opposite each other on said core and being wound in opposite directions,
   said means for enabling relative rotation being such that in such relative rotation, said plurality of windings move sequentially closely adjacent to and past said pole faces;
   said means for commutation connecting each of said plurality of windings to said two electrical energy conductors when said relative rotation moves each of said coils to be completely adjacent to said at least one pole face and disconnecting each of said plurality of windings from said two electrical energy conductors when said relative rotation is about to move each of said coils so that it is not completely adjacent to said at least one pole face.

2. The machine of claim 1 having, in combination with said two-coil windings with oppositely wound coils disposed diametrically opposite each other, first and second assemblies, each field assembly comprising a north pole face and a south pole face, said first and second field assemblies being oriented with said north pole face of said first field assembly facing and directly opposite said north pole face of said second field assembly and said south pole face of said first field assembly facing and directly opposite said south pole face of said second field assembly.

* * * * *